Dec. 13, 1966    J. J. LENTZ    3,291,990
ALL-WEATHER ANGULAR TRACKING SYSTEM
Filed April 8, 1963    3 Sheets-Sheet 1

INVENTOR.
John J. Lentz
BY
Charles M. Hutchins
ATTORNEY

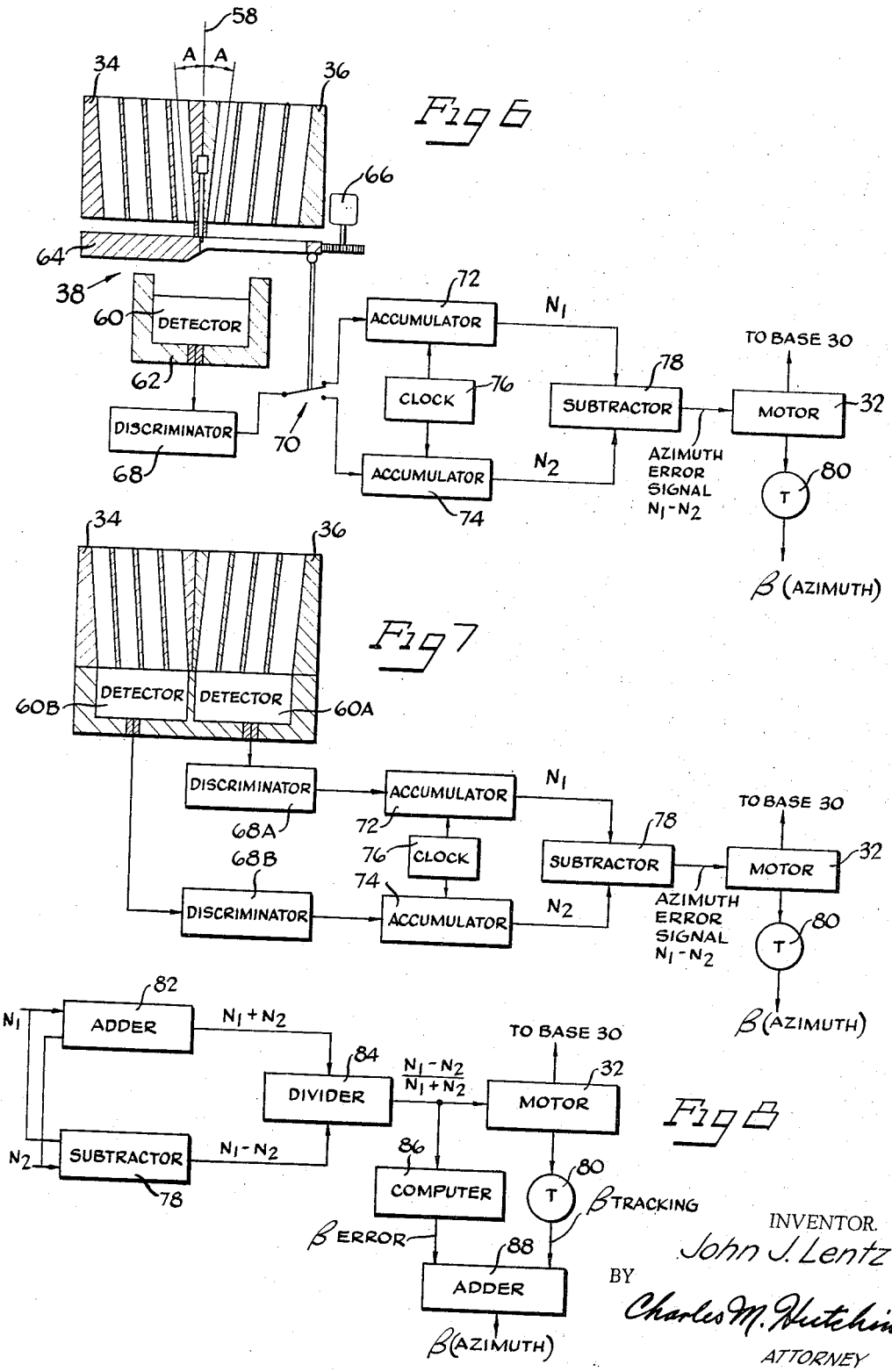

Dec. 13, 1966     J. J. LENTZ     3,291,990
ALL-WEATHER ANGULAR TRACKING SYSTEM
Filed April 8, 1963     3 Sheets-Sheet 3
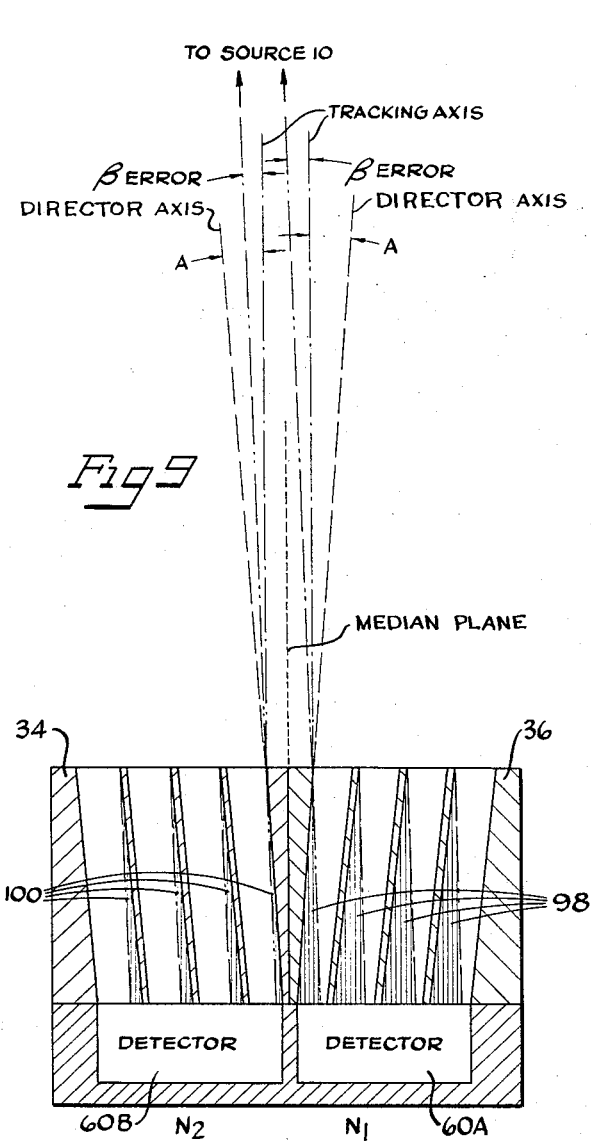
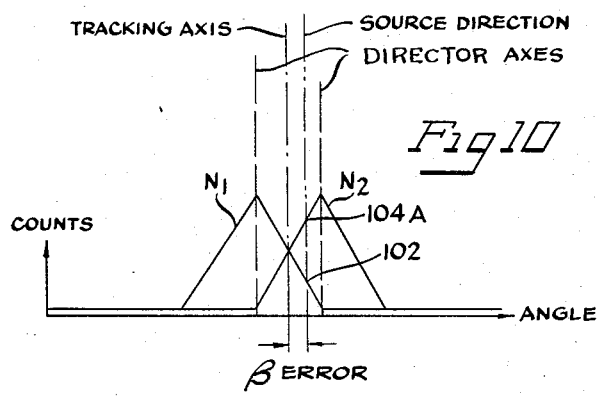
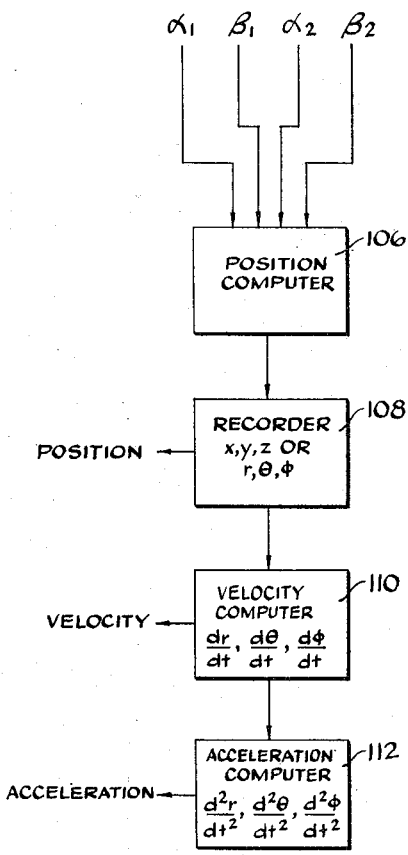
INVENTOR.
John J. Lentz
BY Charles M. Hutchins
ATTORNEY

United States Patent Office 3,291,990
Patented Dec. 13, 1966

3,291,990
ALL-WEATHER ANGULAR TRACKING SYSTEM
John J. Lentz, Columbus, Ohio, assignor to Industrial Nucleonics Corporation, a corporation of Ohio
Filed Apr. 8, 1963, Ser. No. 272,182
23 Claims. (Cl. 250—83.3)

This invention relates to a method and a system for fixing the position of an object located at some distance from a detection station. More particularly, it relates to an angular tracking system whereby the position of an object is determined by measuring at a plurality of ground stations the direction of arrival of penetrative radiations emitted from a source such as a radioactive source affixed to the object.

For various aerospace applications, it is necessary to track accurately or fix the position of a moving body such as a missile, which may be a rocket. In the past, this tracking has been achieved by radar, by Doppler ranging and by optical and infrared measurements. Radar and Doppler ranging are not accurate for short ranges or low velocity. In many operations, it is necessary that the missile be accurately tracked during the early part of its trajectory, particularly in the first thousand feet. Optical and infrared measurements are useful at short range and at low velocities; however, they require fair weather.

It has been suggested that a missile be located by measuring, at a plurality of ground stations, the intensity of penetrative radiations produced by radioactive material carried by the missile and computing the position of the missile from these measurements by triangulation. Such systems have required strong sources or very large detectors to achieve adequate accuracy. It has also been suggested that the direction from which the penetrating radiations are coming be determined as an indication of the direction of the missile and to combine multiple measurements to derive separate indications of three coordinates identifying the instantaneous position of the missile in space relative to a reference datum. This has the advantage that, except for statistical fluctuations, the measurements are independent of source strength. Thus it is not necessary to determine source strength and change instrument calibration when the system is used with different missiles and sources.

The angular tracking system previously suggested involved the rotation of a heavy metal collimator and the determination of the direction of its axis of rotation when the detected radiation remained uniform as the collimator rotated. In the present invention a pair of directors of a type to be described hereinafter are joined together with their axes symmetrically displaced from a median plane. This median plane is moved toward a direction where equal radiation passes through each director. This direction is indicative of the angular position of a plane in which the source lies. A preferred form of the present invention provides for correction of the measurement for the error occasioned by the failure of the tracking unit to follow the source exactly.

It is, therefore, the primary object of the present invention to provide a system which has capability for accurately locating an object such as a missile and following its motion during the initial parts of its trajectory. It is a further object of the invention to track or locate an object under all weather conditions particularly under weather conditions that would render optical tracking devices relatively useless. It is still another object to provide a system for tracking or fixing the position of a source of penetrating radiation, which system is substantially independent of source strength. It is still another object to provide a nuclear angular tracking system for tracking or fixing the position of a body carrying a source of penetrating radiation in which the system determines the angular disposition of the body from each unit. It is a still further object to provide such a system which does not require rotation of a massive collimator. It is also an object to provide such a system employing novel and effective director structures which make possible accurate and precise indications of the deviation of the radiation source from the median plane of the directors. A further object is to provide such a system in which a correction is made to account for the failure of the tracking unit to point exactly at the source. Another object is to provide such a system which takes into account the fact that the nature of the penetrative radiation measurements does not permit direct determination of the instantaneous position of a moving source, but rather they give only its average value over a finite measuring period. Yet another object is to provide a system including means for minimizing the effect of background radiation and scattered radiation having reduced energy as a result of interaction of the source radiation with atoms of the air and the materials of which the directors are constructed, which would otherwise result in flattening of the directional response. A still further object is to minimize the effect of the asymmetrical radiation field resulting from the scattering of radiation by ground objects such as the gantry at a missile launching site. Other objects and advantages will be apparent from consideration of the following description taken in connection with the drawings in which:

FIGURE 6 is an illustration, partly in section and partly diagrammatic, showing one form of detection unit and servo system useful in the tracking unit shown in FIGURE 2;

FIGURE 7 is an illustration, partly in section and partly diagrammatic, showing another form of detection unit and servo system useful in the tracking unit of FIGURE 2;

FIGURE 8 is a block diagram of an alternative servo system and angle indicating circuit useful with the detection units shown in FIGURES 6 and 7;

FIGURE 9 is a diagram illustrating the operation of the tracking units of the present invention;

FIGURE 10 shows the response curves of the detector units under the conditions shown in FIGURE 9; and FIGURE 11 is a block diagram of a computer that may be used in the system shown in FIGURE 1.

The present invention relates to a position indicating system and method, in particular for tracking a moving missile. The missile carries a source such as radioactive material emitting penetrating radiation. "Penetrating radiation," as used herein, refers to high energy, ionizing radiation penetrative of clouds and fog. The penetrating radiations preferred for use in this invention are gamma rays. A fixed detection system, preferably on the ground, simultaneously measures at least three separate planes in each of which lies the radioactive material. The system produces respective signals each indicative of one of these planes. A computer takes these signals and from them computes the instantaneous position of the missile. The computer provides an indication of this position which may be visual and is preferably provided as the three coordinates of a three dimensional coordinate system having a predetermined reference datum. The computer may also compute and indicate the instantaneous velocity or acceleration of the missile.

Although it is necessary to have but three separate planes to define a point in space, it is convenient to measure both azimuth and elevation at respective tracking stations and it is, therefore, convenient to have two measurements of azimuth and two measurements of elevation. This provides additional information that increases the accuracy of measurement. Accuracy can be still further increased by adding additional tracking stations.

Figure 1:
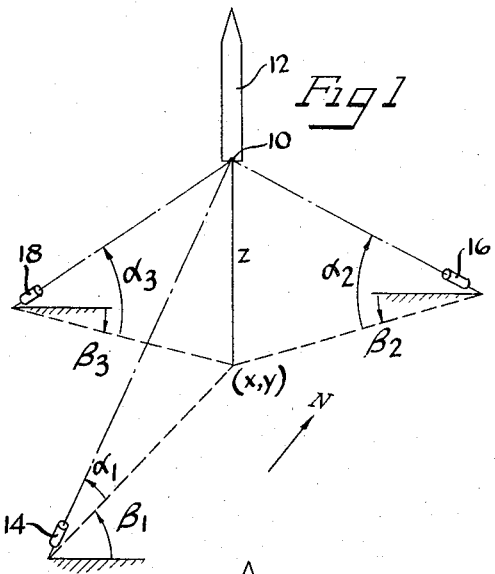
FIGURE 1 is a diagrammatic illustration of one form of the nuclear angular tracking system of the present invention, showing its geometry.

Referring now to FIGURE 1, there is shown a tracking arrangement wherein a radioactive source 10 that produces penetrating radiation is attached to a moving vehicle such as a missile 12. Three tracking units 14, 16, 18 located at respective tracking stations are illustrated. The function of each tracking unit is to obtain an elevation angle $\alpha$ and an azimuth angle $\beta$ relating the angular position of the source to arbitrary elevation and azimuth reference lines. Each tracking unit points toward the source, as will be explained below. The pointing position at each tracking station yields the elevation and azimuth angles. The reference for the azimuth angle illustrated in FIGURE 1 is any arbitrarily established reference line such as an east-west line. The reference for the elevation angle is preferably a plane connecting the three tracking stations, which plane is preferably horizontal. Such reference planes and base lines are determined by appropriate surveying means prior to the actual tracking of a missile. Precise angular information from two stations will fix the position of the source and hence the missile. However, additional accuracy may be obtained by adding redundant information from additional tracking stations, three stations being shown in FIGURE 1. The tracking stations are preferably spaced apart so that the angles between the tracking planes are in the vicinity of 90° over a large portion of the trajectory being measured. Preferably they are spaced about 90° apart about the launching pad of the missile, and when but two stations are used, one is preferably aligned north and south with the launching pad and the other aligned east and west. This simplifies the computer requirements. It is also preferable that each station be spaced from the launching pad by a distance of the order of the height of the part of the trajectory being measured.

Figure 2:
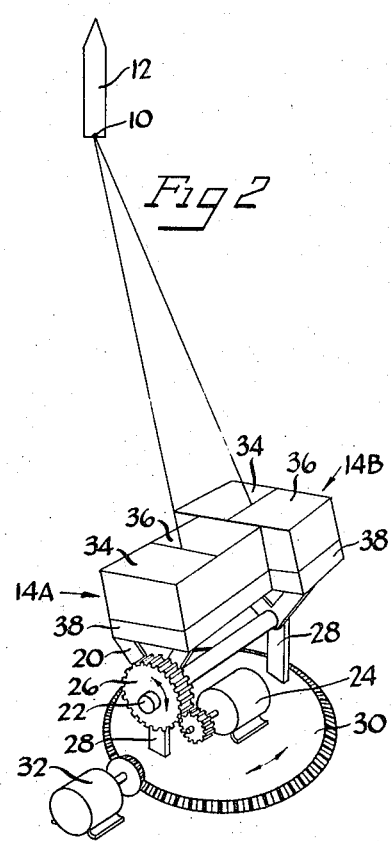
FIGURE 2 is a perspective view showing in greater detail one form of a tracking unit useful in the system shown in FIGURE 1.

FIGURE 2 illustrates a preferred form of the tracking unit 14. The other tracking units may be the same. In its preferred form the tracking unit comprises two units 14A and 14B rigidly fastened together to move as a single unit. Tracking units 14A and 14B are preferably identical except that they are disposed at right angles to each other. In the preferred form of the invention as illustrated, the tracking unit 14A is used to determine the azimuth of the source 10 relative to the tracking unit and tracking unit 14B is used to determine the elevation of the source 10 relative to the tracking unit. Tracking units 14A and 14B are preferably rigidly mounted on a mounting bracket 20. The bracket is mounted for rotation on a shaft 22 about a horizontal axis. It is rotated by the action of a motor 24 which drives a gear 26 to turn the bracket about the horizontal axis. As shown, the shaft 22 is mounted in bearing members 28 which are affixed to a base 30 rotatably mounted on the ground or some other fixed platform. The base is rotated about a vertical axis by the action of a motor 32. As will later be described in greater detail, the motor 32 is controlled by the tracking unit 14A to rotate the tracking unit 14A to direct it at the source 10. Similarly, the motor 24 is controlled by the tracking unit 14B to drive the gear 26 to turn the tracking unit 14B so that it is directed at the source 10. Under these conditions, the direction in which tracking unit 14A is pointing indicates the azimuth of the source 10 relative to the tracking unit, and the direction in which 14B is pointing indicates the elevation of the source 10 relative to the tracking unit.

In a preferred form of the tracking units, as shown in FIGURE 2, each tracking unit comprises a pair of directors 34 and 36 and a detection unit 38. The directors 34 and 36 are disposed in front of the detection unit 38 to limit the directions whence penetrating radiation may reach the detection unit 38 and be detected. As will be explained later in greater detail the directors 34 and 36 are symmetrically disposed and are directed at angles equally diverging from the plane between the two.

Figure 3:
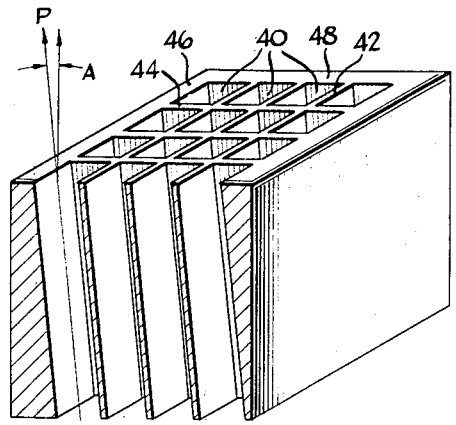
FIGURE 3 is a perspective view, partly in section, showing one form of director useful in the tracking unit shown in FIGURE 2.

The directors may take a number of different forms. A preferred form is as illustrated in FIGURE 3. The director is preferably made of heavy metal which is effective to stop the penetrating radiation. A plurality of parallel passageways 40 extend through the directors, formed by partitions 42 and 44 also made of the heavy metal. The director is preferably flat on top with the transverse partitions 44 perpendicular thereto. The partitions 42 are perpendicular to the partitions 44 but are set at an angle A relative to the normal to the top surface 46 of the director. Thus, the passageways 40 point in a direction P at the angle A relative to the normal to the surface of the director. Radiation reaching the director from the direction P passes through the director to reach the detection unit therebeneath, but radiation coming from other directions is attenuated or eliminated. This has been called an "egg-crate" director.

Figure 4:
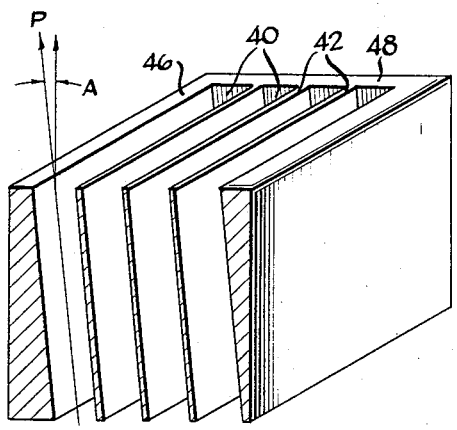
FIGURE 4 is a perspective view, partly in section, showing another form of director useful in the tracking unit shown in FIGURE 2.

Another form of director is shown in FIGURE 4. It is like the director shown in FIGURE 3 except that it has no partitions 44. It thus selectively passes radiation reaching the director parallel to the partitions 42. However, except for the collimation as is produced by the end wall 48, the radiation passed by the director of FIGURE 4 may be from any direction in the plane parallel to the partitions 42 rather than from the single direction as achieved by the director of FIGURE 3. This has been called a "Venetian blind" director.

Figure 5:
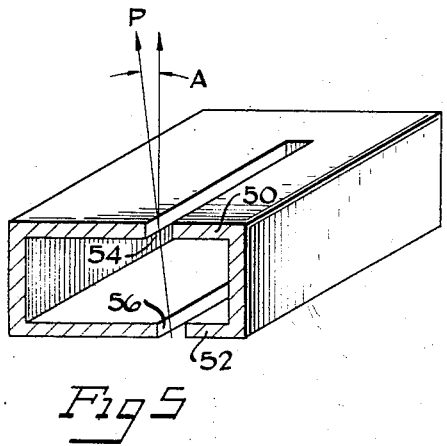
FIGURE 5 is a perspective view, partly in section, showing still another form of director useful in the tracking unit shown in FIGURE 2.

A third form of director is shown in FIGURE 5. It comprises a top plate 50 and a bottom plate 52 defining respective slits 54 and 56. The radiation sensitive part of the detection unit may be mounted in or beneath the slit 56. This director functions in substantially the same way as does the one illustrated in FIGURE 4. It has an advantage in that it does not have the partitions from which gamma rays could be scattered to pass through the collimator to the detection unit. The director shown in FIGURE 3 has an advantage in that it does not pass so many gamma rays other than those from the direction of the source, but of course it can be used only when an orthogonal tracking unit has oriented the director transversely so that the source lies near the axis of the director in the transverse plane.

A preferred form of tracking unit 14A is shown in FIGURE 6. The directors 34 and 36 are disposed in front of the detection unit 38 with their axes symmetrically disposed at equal angles A with respect to the median or tracking plane 58. The detection unit includes a detector 60, which is preferably a scintillation counter, shielded by shield 62 from radiation reaching it other than through the directors 34 and 36. Between the detector 60 and the directors 34 and 36 is a rotatably mounted shutter 64 which is rotated at constant speed by a motor 66. As the shutter 64 rotates, radiation reaches the detector 60 first through director 36 and then through director 34, part of the time reaching the detector through parts of both directors. The shutter 64 is also preferably made of heavy metal sufficient to stop an appreciable amount of the penetrating radiation.

Depending upon the radiation field, more penetrating radiation will reach the directors 34 and 36 from certain directions than from others. In particular, radiation will be most intense from the direction of the source 10. Thus more radiation will pass one or the other of the directors depending upon the relationship between their respective axes and the direction of the source 10. The rotation of the shutter 64 permits separate detection of radiation according to which director the shutter is passing and hence according to the direction whence the radiation came. Whichever director has its axis more nearly directed at the source 10 will pass a greater amount of radiation, and more radiation will be detected during the part of the shutter cycle that the shutter is open to this director. The radiation detected will, therefore, vary as the shutter rotates, more radiation being detected during that part of the cycle when the shutter is open to the director having its axis more nearly directed at the source 10.

The detector 60 is preferably a scintillation counter comprising a scintillating element and a photomultiplier. It is provided with an appropriate power supply. The output of such a detector is a series of pulses. The size of each pulse is related to the amount of energy the detected photon or particle of radiation lost in the phosphor, the larger energies producing larger pulses. The output pulses may include a number of small "dark current" pulses spontaneously produced by the photomultiplier. The output of the detector is applied to a discriminator 68. The discriminator serves in a conventional manner to eliminate the low amplitude pulses. It may also serve to convert the remaining pulses to pulses of uniform size and shape.

The foregoing discussion of the discriminator will suffice for the moment to complete the description of the servo tracking system. A more comprehensive discussion appears hereinafter in connection with the description of a significant and important part of the method and apparatus of the present invention which involves the use of this device as a photon energy discriminator.

The output pulses from the discriminator are switched between two channels by a commutator 70 that is operated in synchronism with the shutter. The commutator may be mechanical, photoelectric or magnetic. As illustrated, it is a cam operated switch. It operates in synchronism with the rotation of the shutter 64 to pass pulses to one or the other of the two channels depending upon which director is covered by the shutter at the time the pulse is produced. Thus one channel is made to contain pulses occurring while the shutter 64 is principally covering one director and the other channel contains pulses arising while the shutter 64 is principally covering the other director. The pulses in one channel are applied to an accumulator 72 whereas those from the other channel are applied to an accumulator 74. Each accumulator includes a counting circuit counting each arriving pulse.

A clock means 76 applies interrogation pulses simultaneously to the two accumulators. Preferably the interrogation pulses are applied periodically, but they need not be. The interrogation pulses cause each accumulator to put out a signal corresponding to the number of counts accumulated since a preceding interrogation pulse. The number of pulses counted in the first channel may be denoted $N_1$, and the number in the second channel $N_2$. Upon completion of the readout, the accumulators are reset to zero and another group of pulses is accumulated. Each accumulator may be in the form of a scaler, or it may comprise a capacitor upon which charge is accumulated. It is also within the scope of this invention that each accumulator include two accumulating circuits so that one can be accumulating pulses while the other is read out. Under such circumstances, the interrogation pulse switches the circuits from one condition to the other.

The output signals from the accumulators 72 and 74 are applied to a circuit 78 which compares the two signals, preferably by determining their difference, to drive an output signal which may be amplified and applied to one of the tracking unit motors. As shown in the drawing the signal is applied to the motor 32 which drives the base 30. The tracking unit shown in FIGURE 6 is thus the azimuth tracking unit 14A; however, the elevational tracking unit 14B would be substantially identical thereto. The signal from the subtractor circuit 78 is thus equal to $N_1-N_2$ and is the azimuth error signal. The output from subtractor circuit 78 depends upon a difference in radiation passing the respective directors, which can exist only when the radiations passing the respective directors 34 and 36 are unequal. This is true whenever the source 10 is not on the median plane 58. When the source 10 is displaced from this median plane, more radiation passes through the particular director more nearly directed toward the source, and the pulses in the respective channel are counted faster. Thus the output of the corresponding accumulator is greater. Under such circumstances, there is an azimuth error signal indicating that the azimuth tracking unit 14A is not directed at the source.

This azimuth error signal is applied to the motor 32 which drives the base 30 to reduce this error by moving the tracking unit so that the source 10 lies in the median plane. At the same time, the motor turns an azimuth angle transmitter 80 which derives a signal corresponding to the azimuth position of the base 30 and hence the direction in which the tracking unit 14A is directed. This signal is indicative of an angle $\beta$, the azimuth of the source 10 with respect to the tracking unit 14.

The tracking unit 14B operates in substantially the same manner to direct the tracking unit 14B so that its median plane is directed toward the source 10. Similarly, this unit provides a signal indicative of the angle $\alpha$, the elevation of the source 10 with respect to the tracking unit 14.

In FIGURE 7 is shown an alternative form of the invention in which separate detectors 60A and 60B are associated with respective directors 68A and 68B. The outputs of the discriminators are applied to respective accumulators 72 and 74 and the rest of the circuit is as disclosed above in connection with the apparatus shown in FIGURE 6. The advantage of the apparatus of FIGURE 7 is that all radiations passing the directors are detected and none of the information is thrown away by intercepting it with the shutter 64. On the other hand, the apparatus shown in FIGURE 6 has the advantage of utilizing but a single detector and a single discriminator so that the efficiency and sensitivity of both channels is the same. This makes the system more stable, making it easier to compare the signals in the two channels accurately.

It may be noted that until the motor 32 has corrected the direction error and reduced the error signal to zero, the signal from the angle transmitter 80 is not truly indicative of the direction of the source 10. It is merely an indication of the direction of the tracking unit. Depending upon the movement of the missile, the rate of interrogation, the counting rates encountered and the speed of the servo system, the tracking unit may be in error by some amount. An approximation of the amount is indicated by the error signal itself. In FIGURE 8 there is illustrated a system for utilizing the error signal itself to correct the angle indication. Only that part of the circuit following the accumulators is shown in FIGURE 8. The prior part of the circuit can be as shown in FIGURE 6 or FIGURE 7. The signals $N_1$ and $N_2$, in addition to being subtracted in subtractor 78, are added in an adding circuit 82. The respective outputs of the subtractor circuit 78 and adder circuit 82 are combined in a divider circuit 84 to derive a signal proportional to the ratio of the difference $N_1-N_2$ and the sum $N_1+N_2$. This signal may be used in the manner of the azimuth error signal of FIGURE 7 to drive the motor 32.

Dividing by the sum of the signals provides a normalized error signal. In absence of this division the error signal is not truly indicative of the amount of error but tells little more than that error exists, because it is dependent upon source strength and range. The difference signal from the subtractor 78 is related to the difference in counting rates which are functions of the distance of the detectors from the source. In other words, at a given angle of error, the radiations detected through the respective directors depend upon how far away the source is. The detection signals are lesser for greater distances. The sum of the two signals is some indication of this distance and is independent of angle over some range near the balanced conditions. By dividing the difference by this sum, the divider 84 derives a signal that is substantially independent of distance and dependent substantially only upon the angle of error by which the median plane 58 of the tracking unit fails to point toward the source 10.

The relationship between the output of the divider 84 and the angle of error depends upon the shape of the radiation field at the directors and upon their structure. For each system, the relationship between this signal and the error angle can be determined empirically and this relationship set up in a computer 86, which then acts to convert this signal into a signal indicative of error. As illustrated, this signal indicates the error in azimuth, $\beta'_{error}$. The primed symbol is used here because the error indicated by this signal lies in a plane tilted upward through an angl $\alpha$, whereas the angle measured by the azimuth angle transmitter 80 lies in a horizontal plane. Hence the proper correction angle $\beta_{error}$ is greater than the indicated error ($\beta'_{error}$), and it is a further function of the computer 86 to multiply $\beta'_{error}$ by the secant of the angle $\alpha$ as measured by the elevation angle transmitter, to provide a sufficiently accurate value of $\beta_{error}$.

As noted above, the output of the azimuth angle transmitter 80 indicates the azimuth of the tracking unit and may be said to be the azimuth tracking angle, $\beta_{tracking}$. This is the angle determined by the apparatus of FIGURES 6 and 7. The signals $\beta_{error}$ and $\beta_{tracking}$ are added in an adder 88 to derive a signal indicative of $\beta$, the true azimuth of the source relative to the pre-established reference axis.

The operation of the symmetrical directors can be better understood by reference to FIGURES 9 and 10. FIGURE 9 is an enlargement of a portion of the apparatus of FIGURE 7. However, the same principles obtain in connection with the apparatus of FIGURE 6. In FIGURE 9 the director axes and the tracking axis are shown. The angle between these two is angle A. For the purposes of illustration, the source is taken to lie in the direction indicated by the arrows. The angle between the direction of the source and the tracking axis is $\beta_{error}$, the angle by which the tracking unit is failing to track exactly. The tracking unit shown in FIGURE 9 is turned by an appropriate driving motor about an axis perpendicular to the drawing. Each director axis by definition lies in a preferred direction which may be parallel to a line or a plane depending upon the arrangement of the director. Directors as shown in FIGURE 3 have a preferred direction parallel to a line. In FIGURE 9 the median plane 58 extends perpendicular to the drawing. This plane is illustrated to represent the effective axis of the director pair, and indicates the plane in which the source lies when the two detectors 60a and 60b are equally "illuminated."

Inasmuch as the source does not lie in the preferred direction of either director; that is, it does not lie along either director axis, both of the detectors intercept some radiation coming in a straight line from the source. As indicated in FIGURE 9, this is like casting a shadow. Director 36 casts shadows 98, and director 34 casts shadows 100. The shadows 98 are larger than the shadows 100 because the source is more nearly aligned with the axis of director 34.

A somewhat idealized set of response curves is shown in FIGURE 10, in which $N_1$ is the response curve for detector 60A, and $N_2$ is the response curve for detector 60B. The curves show counts or counting rate as a function of the angular orientation of the tracking unit of FIGURE 9. It shows the counting rates as the source is disposed at different angles with respect to the tracking unit. The curves have peaks or maximum counting rates where the source is aligned in the direction of the respective director axis. When the source is on the effective axis both counting rates are equal. In FIGURE 10, as an example the source is shown displaced from the tracking axis by the angle $\beta_{error}$. Under such conditions, the counts developed in the two channels are as indicated at points 102 and 104. The difference between the two is related to the angle of deviation, $\beta_{error}$. For the idealized curves of FIGURE 10, the relationship is linear. Under actual conditions, the relationship can be made substantially linear in certain ranges; however, it is not essential that the relationship be linear so long as it is single-valued, for the relationship can be set up in the computer 86 for any single-valued function in a manner well known in the art. The relationship can be determined empirically. Also, as noted above, $N_1$ and $N_2$ vary with range and the curves are normalized by dividing by the sums $N_1+N_2$.

Although the curves of FIGURE 10 are idealized, the apparatus may be arranged so that the response curves shown are not far from the actual case. The preferred radiation sources emit gamma rays. Such radiation is not continuous but is statistical. It is emitted from the source in all directions and upon interacting with matter may result in scattered radiation, some of which may reach the detectors through the directors. If a source of gamma rays were to be located in the direction shown in FIGURE 9, the gamma radiation arriving at the director would be from all directions with a maximum from the direction of the source. Thus, were a director moved about until a maximum number of gamma rays passed the director to reach the respective detector, the axis of that collimator would then be pointing in the direction of the source.

The diffusion of the gamma radiation is such that the directional response of the director is quite flat at the point where the director is pointing at the source. That is, at the point where the director is aligned with the source, movement of the director makes very little change in the radiation passing through it. Under these conditions, the response curves would be flatter than as shown in FIGURE 10, and there would be a relatively large amount of radiation detected even when the source deviated a considerable distance from the collimator axis. Further there is frequently a considerable radiation background from other sources including cosmic rays and there may be an appreciable scattering from the ground which is particularly troublesome at low angles of elevation. This can be largely eliminated by appropriate adjustment of the discriminators 68.

As was noted above, discriminators conventionally eliminate low energy pulses. If the discrimination level is set relatively high the effect of much of the background radiation and the scattered gamma radiation can be eliminated. This is because only the gamma rays passing directly from the source to the detector will have the full energy they started with. It is preferred to use radioactive material that emits substantially monoenergetic gamma radiation or at least mostly gamma rays having relatively high energies within a relatively small range. Cobalt 60 is a satisfactory source. When these gamma rays are scattered, the resultant gamma radiation necessarily has lower energies and gamma rays will reach the collimator from the direction of the source having all energies from the energy of the source gamma rays on down. Gamma rays will also reach the collimator from other directions, but none of these will have the full energy of the gamma rays emitted from the source. Hence in the preferred form of the invention the discrimination level is set to pass substantially only those pulses representative of energies of gamma rays emitted by the source. This makes the background signals much less and makes the effective collimation much greater. It is an important consideration also that it minimizes the effect of an unsymmetrical radiation field such as that resulting where the source radiation is scattered by some object in the vicinity of the tracking units such as the gantry at the missile launching site. It will be apparent that background due to cosmic rays can be substantially reduced by using the well known "window" type of pulse-height selector whereby only pulses having amplitudes in a specific range of V to $V+\Delta V$ are counted. It makes the response curves more nearly like those shown in FIGURE 10.

Referring to the response curves of FIGURE 10, it is preferred that the servo systems keep the tracking axis pointing sufficiently close to the source direction that the source direction not fall outside the director axes. Beyond this point, the relationships change between the difference in counting rate and the angle of deviation. Indeed, at some distance outside the axes, there is substantially no difference in the radiations detected through the respective directors, and the machine would not know which way to go. The degree of collimation is determined by the width and depth of the director passageways 40. The sharper the collimation, the more accurately the position of the source can be identified. However, the source is also more easily lost by getting outside from the director axes. The degree and direction of collimation are made appropriate for the particular tracking to be performed. That is, they are made sufficiently uncritical that sources moving at the expected rates can be followed by the servo systems, yet sufficiently critical that the position of the source can be determined with reasonable accuracy.

Another consideration in tracking the source is the interrogation period. The accumulators 72 and 74 must be interrogated sufficiently often that the information read out is not so old that the source has escaped from between the director axes. On the other hand, the interrogation pulses cannot come so often that there have not been sufficient counts accumulated to determine the deviation error accurately. Further the source can be more easily tracked by supplying pre-flight information to the tracking unit so that from the start the unit is caused to point along the expected flight path of the missile, and therefore effectively measure the deviation from the expected flight path. The motors driving the tracking unit can be supplied with velocity information in lieu of or in addition to position information in order to track the missile more accurately.

Geometrical principles hold that three coordinates define a position in space. These coordinates may be the identification of three planes containing the point, as three intersecting planes intersect in but a single point so long as all three are not collinear. In the preferred form of this invention, each pair of directors is positioned by a servo system so that the tracking plane 58 points at the source on the missile. Although three separate tracking units could be used to identify each of three tracking planes, in the preferred form of the invention, shown in FIGURE 2, each tracking unit is comprised of two orthogonal pairs of directors and therefore supplies sufficient information to identify two tracking planes with each unit.

In practice, the direction of the tracking unit involves controlled motion in two planes. The tracking unit is moved in elevation by motor 24 and in azimuth by motor 32. The azimuth plane is vertical and is the tracking plane 58 of the tracking unit 14A. The elevation plane is orthogonal thereto and is the tracking plane of the tracking unit 14B.

The accumulators and subtractors determine whether more radiation is being detected through one or the other of the directors of a pair. In the case of the pair of directors defining the azimuth plane, the output of the subtractor 78 (in the systems as illustrated in FIGURES 6 and 7) drives the servo motor 32 to turn the detection unit azimuthally to the point where equal radiation signals are derived from the respective sides of the azimuth plane; then the accumulators 72 and 74 develop equal signals and provide a balanced input to the subtractor 78 which then produces no output, and the azimuth motor 32 stops. At this point, the source on the missile lies in the azimuth plane, and the output of the azimuth angle transmitter 80 corresponds to an azimuth angle defining one of the three planes required to define the position of the missile. Similarly, the output of the elevation angle transmitter corresponds to an elevational angle $\alpha$ defining a second of the three planes.

Where the more refined system of FIGURE 8 is used, more exact indications are made of the azimuth angle $\beta$ and the elevation angle $\alpha$, and the outputs of the adders 88 are used as indications of the respective planes.

The third plane is determined by the tracking unit 16. Inasmuch as each tracking unit has information defining two planes, a fourth plane can as well be identified with the tracking unit 16. All of this information is then preferably converted to a coordinate system in which all of the coordinates relate to a fixed datum.

The signal corresponding to the azimuth angles $\beta_1$ and $\beta_2$ as determined by respective tracking units 14 and 16 and the signals corresponding to the elevation angles $\alpha_1$ and $\alpha_2$ as determined by respective tracking units 14 and 16 may be applied to the same sort of computer as utilized in prior optical tracking systems. A block diagram of such a computer is shown in FIGURE 11, where the signals are applied to a position computer 106 which computes the position of the source relative to some reference datum, preferably the launching pad of the missile. The position is indicated in three dimensional coordinates, preferably Cartesian coordinates in which $x$ and $y$ are the horizontal coordinates and $z$ the vertical coordinate, or in space-polar coordinates in which $\theta$ is the azimuth, $\phi$ is the elevation and $r$ is the range. These indications may be recorded on a recorder 108. Further, the computer may include a velocity computer 110 which comprises differentiating circuits to compute $dr/dt$, $d\theta/dt$ and $d\phi/dt$. The computer may also include an acceleration computer 112 which comprises differentiating circuits to compute $d^2r/dt^2$, $d^2\theta/dt^2$ and $d^2\phi/dt^2$.

While preferred embodiments of the invention have been shown and described, various modifications thereof are within the scope of the invention, which is limited only by the claims. For example, although a visual readout is shown and described, the readout indication may be in the form of signals used to control the flight of the missile or to project its flight path to determine where it is going. It is also within the scope of this invention to determine the background radiation present and correct for its influence upon the detection signals. It should also be noted that various of the signals may be either electrical or mechanical and that the adders, subtractors, and dividers may be mechanical as well as electrical.

What is claimed is:

1. Apparatus for tracking a body moving in space and carrying a source such as radioactive material that produces penetrating radiation, said apparatus comprising detection means responsive to said penetrating radiation by producing detection signals systematically related to the radiation detected, a pair of director means disposed before said detection means each restricting the direction whence said penetrative radiation reaches said detection means to a respective preferred direction, comparison means for comparing detection signals related to radiation reaching said detection means from each of said preferred directions defined by said director means, motor means responsive to said comparison means for moving both said director means as a unit to make the compared signals more nearly equal, and means responsive to the position of said director means for deriving a signal indicative of the direction of said source relative to an arbitrarily chosen axis.

2. Apparatus for tracking a body moving in space and carrying a source such as radioactive material that produces penetrating radiation, said apparatus comprising a pair of radiation detectors each responsive to said penetrating radiation by producing detection signals systematically related to the radiation detected, a pair of director means each disposed before a respective one of said pair of radiation detectors for restricting the direction whence said penetrative radiation reaches the respective one of said radiation detectors to a respective preferred direction, comparison means for comparing detection signals from the respective radiation detectors, motor means responsive to said comparison means for moving both said director means as a unit to make the compared signals more nearly equal, and means responsive to the position of said director means for deriving a signal indicative of the direction of said source relative to an arbitrarily chosen axis.

3. Apparatus for tracking a body moving in space and carrying a source such as radioactive material that produces penetrating radiation, said apparatus comprising detection means responsive to said penetrating radiation by producing detection pulses systematically related to the radiation detected, a pair of director means disposed before said detection means each restricting the direction whence said penetrative radiation reaches said detection means to a respective preferred direction, two accumulator means each counting detection pulses relating to radiation reaching said detection means principally from a respective one of said preferred directions defined by one of said director means, comparison means for comparing the number of pulses counted by the respective accumulator means, motor means responsive to said comparison means for moving both said director means as a unit to make the compared numbers more nearly equal, and means responsive to the position of said director means for deriving a signal indicative of the direction of said source relative to an arbitrarily chosen axis.

4. Apparatus for tracking a body moving in space and carrying a source such as radioactive material that produces penetrating radiation, said apparatus comprising detection means responsive to said penetrating radiation by producing signals systematically related to the detected radiation, a pair of director means disposed before said detection means each restricting the direction whence said penetrative radiation reaches said detection means to a respective preferred direction, said detectors being symmetrically disposed and directed at respective angles equally diverging from a plane therebetween, comparison means for comparing detection signals related to radiation reaching said detection means from each of said preferred directions defined by said director means, motor means responsive to said comparison means for moving both said director means as a unit to make the compared signals, and means responsive to the position of said director means for deriving a signal indicative of the direction of said source relative to an arbitrarily chosen axis.

5. Apparatus for tracking a body moving in space and carrying a source such as radioactive material that produces penetrating radiation, said apparatus comprising detection means responsive to said penetrating radiation by producing detection pulses each of a size systematically related to the energy detected of a particular radiation, discrimination means for selectively passing pulses of a size corresponding to the energy of the radiation emitted by said source, a pair of director means disposed before said detection means each restricting the direction whence said penetrative radiation reaches said detection means to a respective preferred direction, comparison means for comparing the number of pulses passing said discrimination means in a predetermined time related to radiation reaching said detection means from each of said preferred directions defined by said director means, motor means responsive to said comparison means for moving both said direction means as a unit to make the numbers more nearly equal, and means responsive to the position of said director means for deriving a signal indicative of the direction of said source relative to an arbitrarily chosen axis.

6. Apparatus for tracking a body moving in space and carrying a source such as radioactive material that produces penetrating radiation, said apparatus comprising a pair of radiation detectors each responsive to said penetrating radiation by producing detection pulses systematically related to the radiation detected, a pair of director means each disposed before a respective one of said pair of radiation detectors for restricting the direction whence said penetrative radiation reaches the respective one of said radiation detectors to a respective preferred direction, means for producing interrogation signals, two counting means each counting detection pulses from a respective one of said radiation detectors and responsive to one of said interrogation signals to produce a counting signal indicative of the number of counts counted since the preceding interrogation signal, comparison means for comparing counting signals from each of said counting means, motor means responsive to said comparison means for positioning both of said director means as a unit to make the compared signals equal, and means responsive to the position of said director means for deriving a signal indicative of the direction of said source relative to an arbitrarily chosen axis.

7. Apparatus for tracking a body moving in space and carrying a source such as radioactive material that produces penetrating radiation, said apparatus comprising a pair of radiation detectors each responsive to said penetrating radiation by producing detection pulses systematically related to the radiation detected, a pair of director means each disposed before a respective one of said pair of radiation detectors for restricting the direction whence said penetrative radiation reaches the respective one of said radiation detectors to a respective preferred direction, two counting means each counting detection pulses greater than a predetermined size from a respective one of said radiation detectors to produce a counting signal indicative of the number of counts counted in a predetermined time, subtraction means responsive to said counting signals from both of said counting means for deriving a first derived signal proportional to their difference, motor means responsive to said first derived signal for positioning both said director means as a unit to reduce said difference, adding means responsive to said counting signals from both of said counting means for deriving a second derived signal proportional to their sum, dividing means responsive to said first and second derived signals for deriving a third derived signal indicative of the ratio of said first to said second derived signals, means responsive to the position of said director means for deriving a fourth derived signal indicative thereof, and means for additively combining said third and fourth signals to derive a fifth derived signal indicative of the direction of said source relative to an arbitrarily chosen axis.

8. Apparatus for tracking a body moving in space and carrying a source such as radioactive material that produces penetrating radiation, said apparatus comprising detection means responsive to said penetrating radiation for separately detecting radiation arriving at said detection means from different sides of a tracking plane by producing two respective detection signals each systematically related to the radiation detected arriving from a respective side of said tracking plane, means responsive to said two signals for deriving a first derived signal proportional to the ratio of the difference and sum of said two signals, means responsive to said first derived signal for positioning said tracking plane to reduce said first derived signal, means responsive to the position of said tracking plane for deriving a second derived signal indicative thereof, and means for combining said first and second derived signals for deriving a third derived signal indicative of the direction of said source relative to an arbitrarily chosen axis.

9. Apparatus for tracking a body moving in space and carrying a source such as radioactive material that produces penetrating radiation, said apparatus comprising detection means responsive to said penetrating radiation for separately detecting radiation arriving at said detection means from different sides of a tracking plane by producing two respective detection signals each systematically related to the radiation detected arriving from a respective side of said tracking plane, comparison means responsive to said two signals for deriving a first derived signal indicative of their relative magnitudes independent of their absolute magnitudes, means responsive to said first derived signal for positioning staid tracking plane to reduce said first derived signal, means responsive to the position of said tracking plane for deriving a second derived signal indicative thereof, and means for combining said first and second derived signals for deriving a third derived signal indicative of the direction of said source relative to an arbitrarily chosen axis.

10. Apparatus for tracking a body moving in space and carrying a source such as radioactive material that produces penetrating radiation, said apparatus comprising detection means responsive to said penetrating radiation for separately detecting radiation arriving at said detection means from different sides of a tracking plane by producing two respective detection signals each systematically related to the radiation detected arriving from a respective side of said tracking plane, means responsive to said two signals for positioning said tracking plane to make the two signals more nearly equal, means responsive to the position of said tracking plane for deriving a first derived signal indicative thereof, means responsive to said two signals for deriving a second derived signal indicative of the deviation of said source from said tracking plane, and means for combining said first and second derived signals for deriving a third derived signal indicative of the direction of said source relative to an arbitrarily chosen axis.

11. Apparatus for tracking a body moving in space and carrying a source such as radioactive material that produces penetrating radiation, said apparatus comprising detection means responsive to said penetrating radiation for determining the direction of said source relative to a tracking plane associated with said detection means by producing a first signal indicative thereof, means responsive to said first signal for moving said detection means in such direction as to reduce said first signal and thereby place said tracking plane more nearly in the direction of said source, means responsive to the position of said detection means for deriving a second signal indicative of the position of said tracking plane, and means for combining said first and second signals to derive a third signal indicative of the direction of said source relative to an arbitrarily chosen axis.

12. Apparatus at a detection station for tracking a body moving in space and carrying a source such as radioactive material that produces penetrating radiation, which comprises means for measuring said penetrating radiation reaching said detection station in preferred directions one on each side of a tracking plane, means for comparing the measured radiation intensities, means for moving said preferred directions and said tracking plane as a unit to make the compared intensities more nearly equal, and means for deriving an indication of the direction of said tracking plane relative to an arbitrarily chosen axis.

13. Apparatus at a detection station for tracking a body moving in space and carrying radioactive material that produces penetrating radiation, which comprises means for measuring said penetrating radiation reaching said detection station in two different directions one on each side of a tracking plane, and having substantially the energy of said penetrating radiation as it leaves said body, means for comparing the measured radiation intensities, means for moving said preferred directions and said tracking plane as a unit to make the compared intensities more nearly equal, and means for deriving an indication indicative of the direction of said tracking plane.

14. Apparatus at a detection station for tracking a body moving in space and carrying radioactive material that produces penetrating radiation, which comprises means for collimating said penetrating radiation reaching said detection station to restrict the direction whence said penetrative radiation reaches said detection station to two preferred directions one on each side of a tracking plane, means for separately detecting radiation reaching said detection station from each of said two preferred directions by producing a pair of detection signals each systematically related to the radiation detected from a respective one of said preferred directions, means for comparing said detection signals by deriving a first derived signal indicative of their relative magnitude and independent of their absolute magnitude, means for moving said preferred directions and said tracking plane as a unit to make the compared signals more nearly equal, means for deriving a second derived signal indicative of the direction of said tracking plane, means for and combining said first and second derived signals to derive a third derived signal indicative of the direction of said radioactive material relative to said detection station.

15. Apparatus at a detection station for tracking a body moving in space and carrying radioactive material that produces penetrating radiation which comprises means for separately detecting penetrating radiation arriving at said detection station from different sides of a tracking plane by producing two respective detection signals each systematically related to the radiation detected arriving from a respective side of said tracking plane, means for positioning said tracking plane to make the two signals more nearly equal, means for deriving a first derived signal indicative of the direction of said tracking plane, means for deriving a second derived signal indicative of the deviation of said radioactive material from said tracking plane, and means for combining said first and second derived signals to derive a third derived signal indicative of the direction of said radioactive material relative to said detection station.

16. Apparatus for tracking a body moving in space, which comprises means for determining the direction of said body relative to a tracking plane by producing a first signal indicative of said direction, means for moving said tracking plane in such direction as to reduce said first signal and thereby place said tracking plane more nearly in the direction of said body, means for deriving a second signal indicative of the direction of said tracking plane, said second signal being subject to error in its indication of said tracking plane direction until said first signal reduces to a value indicating the tracking plane is actually in the direction of said body, and means for compensating for said error by combining said first and second signals to derive a third signal indicative of the direction of said body relative to a reference datum.

17. Apparatus for tracking a body moving in space, comprising detection means responsive to radiation from said body for determining the direction of said body relative to a tracking plane associated with said detection means by producing a first signal indicative thereof, means responsive to said first signal for moving said detection means in such direction as to reduce said first signal and thereby place said tracking plane more nearly in the direction of said body, means responsive to the position of said detection means for deriving a second signal indicative of the direction of said tracking plane, said second signal being subject to error in its indication of said tracking plane direction until said first signal becomes effectively zero, and means for compensating for said error by combining said first and second signals to derive a third signal indicative of the true direction of said body relative to said detection means.

18. Apparatus located at a tracking station for indicating the azimuth of a body moving in space and carrying a source such as radioactive material that produces penetrating radiation, said apparatus comprising detection means responsive to said penetrating radiation for separately detecting radiation arriving at said detection means from different sides of a vertical tracking plane by producing two respective detection signals each systematically related to the radiation detected arriving from a respective side of said vertical tracking plane, comparison means responsive to said two signals for deriving an indicated azimuth deviation signal indicative of their relative magnitudes independent of their absolute magnitudes, means responsive to said first derived signal for azimuthally positioning said tracking plane to reduce said indicated azimuth deviation signal, means located at said tracking station and responsive to said penetrative radiation for providing a signal indicating the elevation angle of said source, means for modifying said indicated azimuth deviation signal in accordance with a mathematical function of said elevation angle indicative signal to derive a corrected azimuth deviation signal, means responsive to the position of said vertical tracking plane for deriving a third derived signal indicative of said position, and means for combining said position-indicative signal and said corrected azimuth deviation signal for deriving an output signal indicative of the azimuth of said source relative to an arbitrarily chosen axis.

19. Apparatus, as described in claim 1, wherein, each of said directors has a housing of penetrative radiation absorbing material opened at opposite ends and a plurality of plates of penetrative radiation absorbing material spaced apart, parallel and fixed in said housing between said housing open ends, said plates of said directors being disposed respectively at angles equally diverging from a plane therebetween.

20. Apparatus, as described in claim 1, wherein, each of said directors has a housing of penetrative radiation absorbing material having at least one passageway for receiving radiation from a preferred direction, said passageways of said directors being directed respectively at angles equally diverging from a plane therebetween.

21. Apparatus, as described in claim 1, wherein, each of said directors has a housing of penetrative radiation absorbing material opened at opposite ends, a plurality of first plates of penetrative radiation absorbing material spaced apart, parallel and fixed in said housing between said housing open ends, a plurality of second plates of penetrative radiation absorbing material spaced apart, parallel and fixed in said housing between said housing open ends and transverse to said first plates, said second plates of said directors being disposed respectively at angles equally diverging from a plane therebetween.

22. Apparatus, as described in claim 1, wherein, each of said directors has a housing of penetrative radiation absorbing material, said housing having a first aperture adjacent said detection means and a second aperture on the opposite side from said detection means, said apertures being in alignment at an angle from a plane, said angle for said directors being disposed equally diverging from a plane between said directors.

23. In apparatus for precisely tracking a body moving in space and carrying a source, such as radioactive material that produces penetrating radiation, said apparatus being of the type having shield means and detection means responsive to said penetrating radiation not absorbed by said shield means for determining the direction of said source relative to a tracking plane associated with said detection means and shield means, the improvement comprising means for selecting the energy to which said detection means is responsive to correspond only with the energy of the radiation emitted by said source, and means for tracking said source with said detection means and shield means to maintain alignment of said tracking plane with said source direction.

References Cited by the Examiner

UNITED STATES PATENTS

| | | | |
|---|---|---|---|
| 2,930,545 | 3/1960 | Houle et al. | 244—14 |
| 3,028,493 | 4/1962 | Takahashi | 250—71.5 |
| 3,037,121 | 5/1962 | Collison | 250—203 |
| 3,091,463 | 5/1963 | Cohen et al. | 250—71.5 X |

References Cited by the Applicant

Applied X-Rays, by George L. Clark, 3rd Edition, McGraw-Hill Book Company, Inc., New York, 1948, pp. 139–141.

RALPH G. NILSON, *Primary Examiner.*

ARCHIE R. BORCHELT, *Examiner.*